United States Patent
Choi (10) Patent No.: US 10,064,016 B2
(45) Date of Patent: Aug. 28, 2018

(54) METHOD AND APPARATUS FOR CONNECTION CONFIGURATION BETWEEN BASE STATION AND TERMINAL

(71) Applicant: ELECTRONICS AND TELECOMMUNICATIONS RESEARCH INSTITUTE, Daejeon (KR)

(72) Inventor: Min Suk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 31 days.

(21) Appl. No.: 15/238,311

(22) Filed: Aug. 16, 2016

(65) Prior Publication Data

US 2017/0055301 A1 Feb. 23, 2017

(30) Foreign Application Priority Data

Aug. 21, 2015 (KR) .................. 10-2015-0118032

(51) Int. Cl.
*G01R 31/08* (2006.01)
*H04W 4/02* (2018.01)
(Continued)

(52) U.S. Cl.
CPC ............ *H04W 4/027* (2013.01); *H04W 76/11* (2018.02); *H04W 76/38* (2018.02); *H04L 61/6054* (2013.01)

(58) Field of Classification Search
CPC .......................... H04W 28/0263; H04W 72/005
(Continued)

(56) References Cited

U.S. PATENT DOCUMENTS 8,514,831 B2   8/2013  Yeo et al.
8,983,396 B2   3/2015  Nukala et al.
(Continued)

FOREIGN PATENT DOCUMENTS

KR   10-2014-0124411 A   10/2014

OTHER PUBLICATIONS

3rd Generation Partnership Project, Technical Specification Group Services and System Aspects, "General Packet Radio Service (GPRS) enhancements for Evolved Universal Terrestrial Radio Access Network (E-UTRAN) access", Release 11, 3GPP TS 23.401, V11.11.0, pp. 1-286, Dec. 2014.

(Continued)

*Primary Examiner* — Iqbal Zaidi
(74) *Attorney, Agent, or Firm* — Rabin & Berdo, P.C.

(57) ABSTRACT

Provided are a method for a connection configuration of a base station including: operating a C-RNTI release timer for release of a C-RNTI which is used in a connection mode before an idle mode after a terminal is transited to the idle mode; and configuring a connection with the terminal by using the C-RNTI before the C-RNTI release timer is expired, a method for connection configuration of a terminal including: receiving information on a release time of a C-RNTI which is used in a connection mode before an idle mode from a base station after being transited to the idle mode; and configuring a connection with the base station by using the existing C-RNTI when a transmission request of uplink data occurs for the release time, and the terminal.

15 Claims, 5 Drawing Sheets

(51) Int. Cl.
*H04W 76/38* (2018.01)
*H04W 76/11* (2018.01)
*H04L 29/12* (2006.01)

(58) Field of Classification Search
USPC .................................................. 370/230–339
See application file for complete search history.

(56) References Cited

U.S. PATENT DOCUMENTS

| | | | |
|---|---|---|---|
| 2010/0118752 A1* | 5/2010 | Suzuki | H04W 76/048 370/311 |
| 2010/0189071 A1* | 7/2010 | Kitazoe | H04W 74/002 370/331 |
| 2012/0281566 A1 | 11/2012 | Pelletier et al. | |
| 2013/0017817 A1 | 1/2013 | Kim et al. | |
| 2013/0223370 A1 | 8/2013 | Larmo et al. | |
| 2014/0220981 A1 | 8/2014 | Jheng et al. | |
| 2014/0307659 A1 | 10/2014 | Kweon et al. | |
| 2015/0043455 A1 | 2/2015 | Miklos et al. | |
| 2016/0302124 A1* | 10/2016 | Morita | H04W 16/08 |

OTHER PUBLICATIONS

3rd Generation Partnership Project, Technical Specification Group Radio Access Network, "Evolved Universal Terrestrial Radio Access (E-UTRA) Mobility enhancements in heterogeneous networks", Release 11, 3GPP TR 36.839, V11.1.0, pp. 1-53, Dec. 2012.

3rd Generation Partnership Project, Technical Specification Group Services and System Aspects, Architecture enhancements for Cellular Internet of Things, Release 13, 3GPP TR 23.720, V0. 1.0(Jul. 2015).

* cited by examiner

METHOD AND APPARATUS FOR CONNECTION CONFIGURATION BETWEEN BASE STATION AND TERMINAL

CROSS-REFERENCE TO RELATED APPLICATION

This application claims priority to and the benefit of Korean Patent Application No. 10-2015-0118032 filed in the Korean Intellectual Property Office on Aug. 21, 2015, the entire contents of which are incorporated herein by reference.

BACKGROUND OF THE INVENTION (a) Field of the Invention

The present invention relates to a method and an apparatus for configuring a connection between a terminal and a base station.

(b) Description of the Related Art

Recently, in $3^{rd}$ generation partnership project (3GPP) of a wireless mobile communication system, a high speed wireless data transmission service is provided to users by providing various mobile communication environments such as high speed downlink packet access (HSDPA), high speed uplink packet access (HSUPA), long term evolution (LTE), and LTE-Advanced (LTE-A).

Recently, while a smartphone market grows largely, various techniques for providing a high-quality service to the user with limited capacity have been proposed. Representatively, a carrier aggregation (CA) technique is a technique capable of transmitting/receiving data by extending a bandwidth as one of the methods for satisfying a data transmission speed. In a dual connectivity structure, the terminal may use radio resources of at least two network nodes (a master eNB (MeNB) and a secondary eNB (SeNB)) which are connected to each other through non-ideal backhaul in a radio resource control (RRC) connected situation. In order to increase throughput of the terminal using the dual connectivity, a method of aggregating the radio resources is also under discussion.

Recently, in the LTE-A, researches for reducing overhead of signaling together with efforts to improve the efficiency of traffic transmission are also in progress. For example, a random access channel (RACH) is omitted, and there is a random access less technique for accessing a base station while omitting a random access channel (RACH), a contention-based random access technique, a contention-based uplink transmission technique for allocating an uplink grant (UL Grant) without a separate scheduling request, or a pre-scheduling technique. The terminal may receive a service by reducing signaling overhead and performing only least procedures using the above techniques which have been recently proposed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for briefly and rapidly configuring a connection between a terminal and a base station.

An exemplary embodiment of the present invention provides a method for a connection configuration of a terminal. The method for a connection configuration includes: receiving information on a release time of a cell-radio network temporary identifier (C-RNTI) which is used in a connection mode before an idle mode from a base station after being transited to the idle mode; and configuring connection with the base station by using the C-RNTI when a transmission request of uplink data to the base station occurs for the release time.

The method for connection configuration may further include configuring a connection with a network including the base station by using an existing non-access stratum (NAS) identifier (ID) when the transmission request of uplink data to the base station occurs after the release time elapses.

The configuring of the connection by using the existing NAS ID may include broadcasting a preamble for random access to the base station.

The NAS ID may be a unique identifier between the terminal and an MME, used in the connection mode before the idle mode.

The NAS ID may include at least one of an international mobile equipment identity, an international mobile subscriber identity, and a globally unique temporary identifier.

The method for connection configuration may further include verifying validity of an existing TA used in the connection mode before the idle mode; and transmitting the uplink data based on the uplink grant received from the TA and the base station when the existing TA is valid.

The verifying may include verifying validity of the TA based on a moving distance of the terminal calculated through MSE and a TA change distance for the TA.

Another exemplary embodiment of the present invention provides a method for connection configuration of a base station. The method for connection configuration of the base station includes: operating a C-RNTI release timer for release of a C-RNTI which is used in a connection mode before an idle mode after a terminal is transited to the idle mode; and configuring connection with the terminal by using the C-RNTI when a connection request is received from the terminal before the C-RNTI release timer is expired.

The method for connection configuration may further include configuring the connection with the terminal by using an existing non-access stratum (NAS) identifier (ID) when a preamble for random access is received from the terminal after the C-RNTI release timer is expired.

The NAS ID may be a unique identifier between the terminal and a mobility management entity (MME), used in the connection mode before the idle mode.

The NAS ID may include at least one of an international mobile equipment identity, an international mobile subscriber identity, and a globally unique temporary identifier.

The method for a connection configuration may further include receiving the transmitted uplink data when an existing timing advance (TA) transmitted to the terminal is valid.

The method for a connection configuration may further include maintaining connection with a gateway configured in the connection mode before the idle mode while the C-RNTI release timer operates.

Yet another exemplary embodiment of the present invention provides a terminal including: at least one processor; a memory; and an RF unit, in which at least one processor executes at least one program stored in the memory to perform receiving information on a release time of a cell-radio network temporary identifier (C-RNTI) which is used in a connection mode before an idle mode from a base station after being transited to the idle mode, and configuring connection with the base station by using the C-RNTI when a transmission request of uplink data to the base station occurs for the release time.

At least one processor may execute at least one program to further perform configuring a connection with a network including the base station by using an existing non-access stratum (NAS) identifier (ID) when the transmission request of uplink data to the base station occurs after the release time elapses. When performing the configuration of the connection by using the existing NAS ID, at least one processor may perform broadcasting of a preamble for random access to the base station.

The NAS ID may be a unique identifier between the terminal and a mobility management entity (MME), used in the connection mode before the idle mode.

The NAS ID may include at least one of an international mobile equipment identity, an international mobile subscriber identity, and a globally unique temporary identifier.

At least one processor may execute at least one program to further perform validity of an existing timing advance (TA) used in the connection mode before the idle mode, and transmitting the uplink data based on the uplink grant received from the TA and the base station when the existing TA is valid.

The at least one processor may execute the verifying to perform verifying validity of the TA based on a moving distance of the terminal calculated through MSE and a TA change distance for the TA.

According to the exemplary embodiment of the present invention, it is possible to simplify a connection procedure between a terminal and a base station and between the base station and a gateway and rapidly allocate an uplink resource to the terminal by reusing the existing C-RNTI through a C-RNTI release timer and reusing the existing TA by determining the validity.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, a terminal may also refer to a mobile station (MS), a mobile terminal (MT), an advanced mobile station (AMS), a high reliability mobile station (HR-MS), a subscriber station (SS), a portable subscriber station (PSS), an access terminal (AT), user equipment (UE), or the like, and may also include all or some functions of the MT, the MS, the AMS, the HR-MS, the SS, the PSS, the AT, the UE, or the like.

Further, a base station (BS) may also refer to an ABS), a HR-BS, a node B, an evolved node B (eNodeB), an access point (AP), a radio access station (RAS), a base transceiver station (BTS), a mobile multihop relay (MMR)-BS, a relay (RS) serving as the BS, a relay node (RN) serving as the BS, an advanced relay station (ARS) serving as the BS, a high reliability relay station (HR-RS) serving as the BS, small BSs [a Femto BS, a home node B (HNB), a home eNodeB (HeNB), a pico BS, a macro BS, a micro BS, and the like], or the like, and may also include all or some functions of ABS, nodeB, eNodeB, AP, RAS, BTS, MMR-BS, RS, RN, ARS, HR-RS, the small BSs, or the like.

Figure 1:
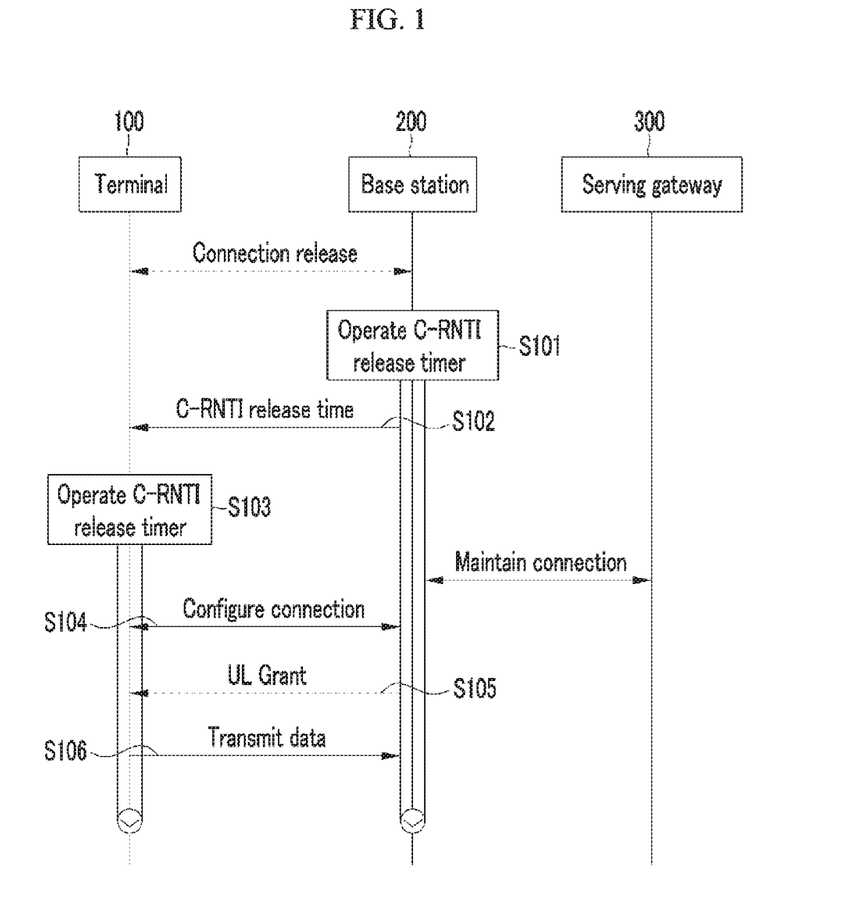
FIG. 1 is a diagram illustrating a connection method while a timer of a terminal operates according to an exemplary embodiment of the present invention.

FIG. 1 is a diagram illustrating a connection method while a timer of a terminal operates according to an exemplary embodiment of the present invention.

The terminal according to the exemplary embodiment of the present invention may use a cell-radio network temporary identifier (C-RNTI) and a timing advance (TA) which have been used in a previous connection state, when an idle mode is transited to a connected mode.

First, the BS operates a timer for the C-RNTI (a C-RNTI release timer), when connection with the terminal is released (when the terminal in the connected mode is transited to the idle mode) (S101). In this case, the C-RNTI release timer may be a timer notifying an end of a time (C-RNTI release time) of maintaining the C-RNTI in the BS. That is, the BS may maintain the C-RNTI registered in the initial connection of the terminal while the C-RNTI operates. Further, the connection between the BS and a serving gateway (S-gateway) which is configured using the C-RNTI may be maintained while the C-RNTI release timer operates.

In addition, the BS transfers information on the C-RNTI release time (C-RNTI release time information) to the terminal (S102). The terminal receives the C-RNTI release time information to operate the C-RNTI release timer and store the previously used C-RNTI and TA (S103).

Thereafter, when the state of the terminal is transited from the idle mode to the connection mode within the C-RNTI release time, the connection with the BS is configured by using the existing C-RNTI (S104). The BS configuring the connection using the terminal and the existing C-RNTI allocates an uplink grant to the terminal (S105). Alternatively, when a terminal according to another exemplary embodiment of the present invention performs contention based uplink (CB UL) transmission or pre-scheduling, the BS may omit an uplink grant allocating procedure.

Thereafter, the terminal may transmit data to the BS by using the resource allocated through the existing TA and the uplink grant (S106). Further, the terminal according to the exemplary embodiment of the present invention may use the existing TA without the TA allocation procedure from the BS when the existing TA is valid by verifying the validity of the existing TA.

Figure 2:
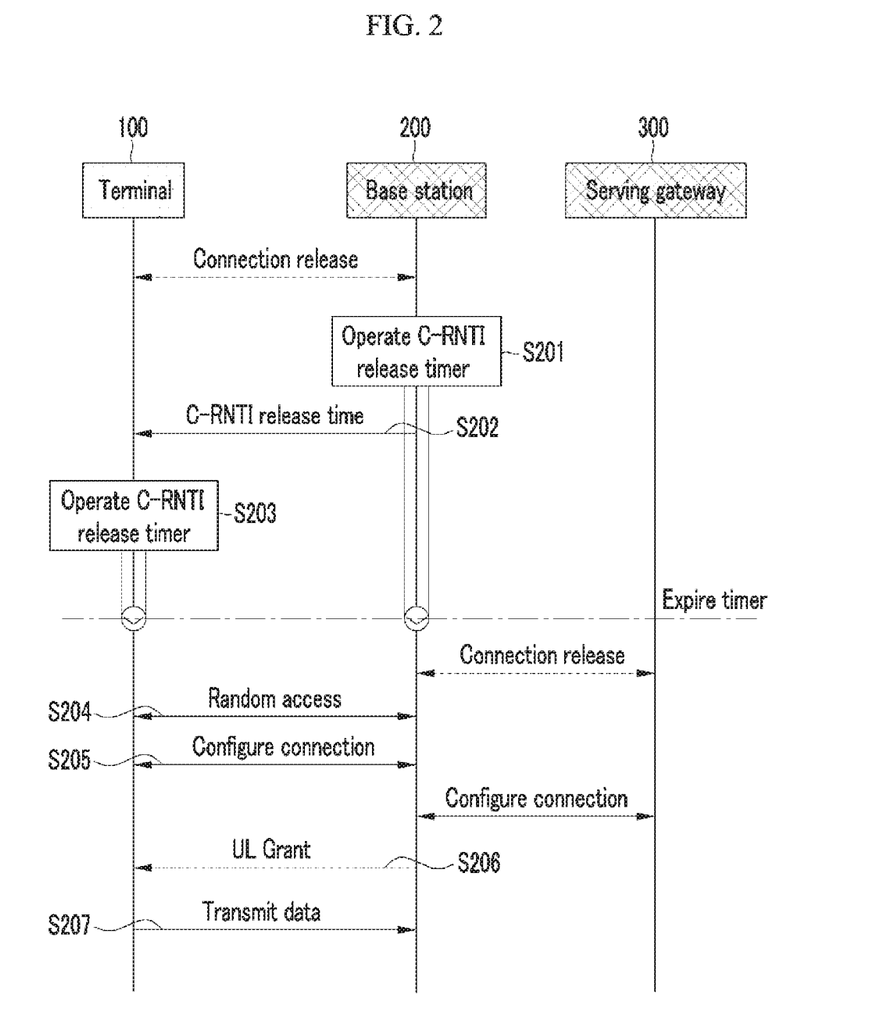
FIG. 2 is a diagram illustrating a connection method after the timer of the terminal ends according to the exemplary embodiment of the present invention.

FIG. 2 is a diagram illustrating a connection method after the timer of the terminal ends according to the exemplary embodiment of the present invention.

Referring to FIG. 2, first, the BS operates the C-RNTI release timer when the connection with the terminal is released (S201) and transfers the C-RNTI release time information to the terminal (S202). The terminal receiving the C-RNTI release time information from the BS operates the C-RNTI release timer (S203). A terminal according to another exemplary embodiment of the present invention performs a random access procedure (including preamble broadcasting and the like) (S204) and then configures the connection with the BS (S205), when a data transmission request to the BS occurs (that is, the idle mode is transited to a connection mode after the C-RNTI release time elapses (that is, after the C-RNTI timer is expired). In this case, the terminal may configure the connection with the BS by using an existing non-access stratum (NAS) identification (ID). That is, the terminal performs the RA procedure with respect to the BS for receiving information required for the connection and may access a network by using the existing NAS ID. In this case, the existing NAS ID as a unique ID between the terminal and a mobility management entity (MME) which is used in a previous connection (a connection mode before the idle mode) between the terminal and the MME may include at least one of an international mobile equipment identity (IMEI), an international mobile subscriber identity (IMSI), and a globally unique temporary identifier (GUTI). In the exemplary embodiment of the present invention, the existing NAS ID is the unique ID between the terminal and the MME and stored in both the BS and the terminal to be used for connection configuration between the terminal and the BS when the C-RNTI release timer is expired.

Thereafter, the connection configuration is performed even between the BS and the S-gateway, and the BS allocates the uplink grant to the terminal (S206). Alternatively, when the terminal according to another exemplary embodiment of the present invention performs contention based uplink transmission or pre-scheduling, the BS may omit the uplink grant allocation. Thereafter, the terminal may transmit the data to the BS by using the uplink resource allocated through the uplink grant (S207).

Figure 3:
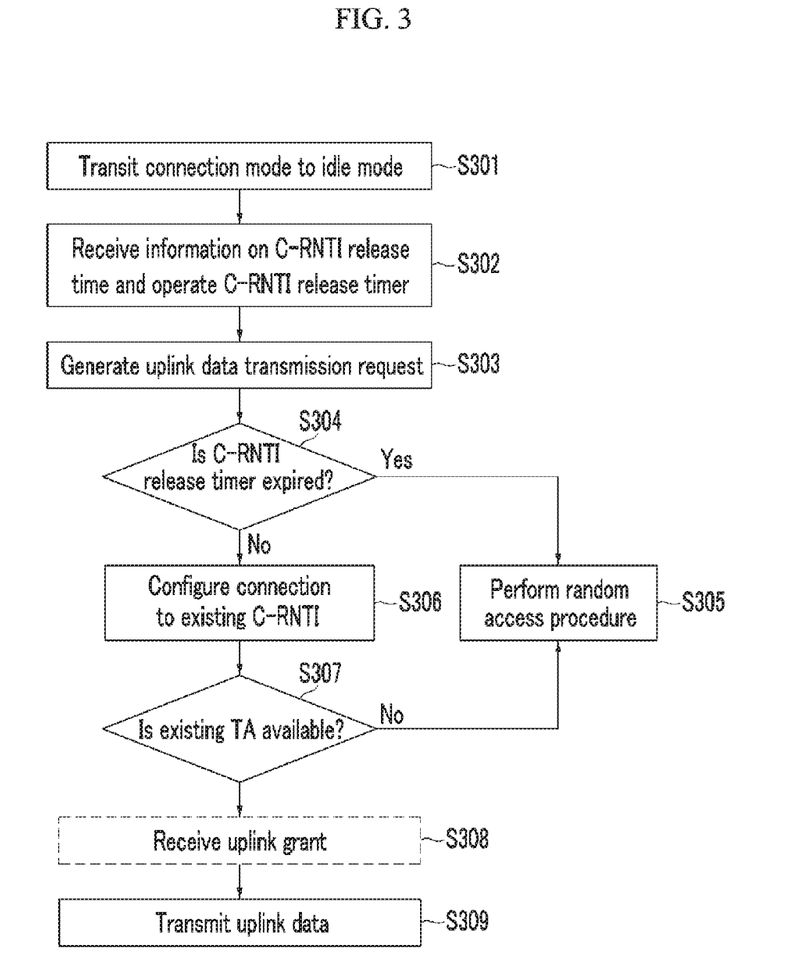
FIG. 3 is a flowchart illustrating an operation of the terminal according to the exemplary embodiment of the present invention.

FIG. 3 is a diagram illustrating an operation of the terminal according to the exemplary embodiment of the present invention.

In FIG. 3, when the terminal is transited from the connected mode to the idle mode (S301), the connection between the terminal and the BS is released. In addition, the terminal receives the C-RNTI release time information from the BS and operates the C-RNTI release timer (S302).

Thereafter, when the transmission request of the uplink data occurs (S303), the terminal verifies whether the C-RNTI release timer is expired (S304). When the C-RNTI release timer is expired, the terminal broadcasts a preamble for random access to configure the connection with the BS (S305). In this case, the terminal may use the existing NAS ID.

However, when the C-RNTI release time is not yet expired (that is, while the C-RNTI release timer operates), the terminal configures the connection with the BS by using the existing C-RNTI (S306). In addition, the terminal verifies the validity of the existing TA (S307). The terminal according to the exemplary embodiment of the present invention calculates a moving distance of the terminal through mobility speed estimation (MSE) and may verify the validity of the existing TA by comparing a TA change distance with the calculated moving distance. The moving distance of the terminal through the MSE may be calculated by estimating the moving speed of the terminal and multiplying a time when the C-RNTI release timer operates by the estimated moving speed. The TA change distance is a distance at which the TA is changed when the moving distance of the terminal is larger than a predetermined value. For example, when the existing TA is 8 and the moving distance of the terminal is larger than the predetermined value in a direction far away from the BS, the TA to be used by the terminal is 9, and when the moving distance of the terminal is smaller than the predetermined value in a direction closer to the BS, the TA to be used by the terminal may be 7. That is, the terminal according to the exemplary embodiment of the present invention does not reuse the existing TA when the moving distance of the terminal calculated through the MSE is larger than the TA change distance, and reuses the existing TA when the moving distance of the terminal is smaller than the TA change distance.

When the existing TA is not valid, the terminal receives the TA from the BS in the random access process and then may configure the connection with the BS (S305). However, when the existing TA is valid, the terminal receives the uplink grant from the BS (S308). Alternatively, when the terminal according to another exemplary embodiment of the present invention performs the contention based uplink transmission or the pre-scheduling, the uplink grant may be omitted. In addition, the terminal may transmit the data to the BS by using the uplink resource allocated through the existing TA and the uplink grant (S309).

Figure 4:
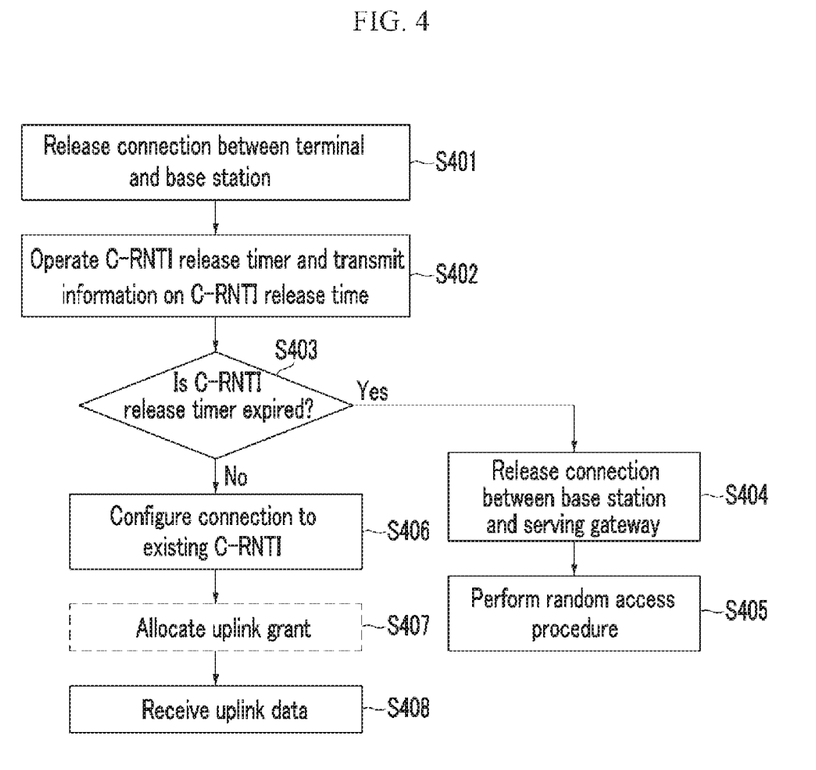
FIG. 4 is a flowchart illustrating an operation of a base station according to the exemplary embodiment of the present invention.

FIG. 4 is a flowchart illustrating an operation of a base station according to the exemplary embodiment of the present invention.

In FIG. 4, when the terminal is transited from the connected mode to the idle mode, the connection between the terminal and the BS is released (S401). Thereafter, the BS operates the C-RNTI release timer and transmits the C-RNTI release time information to the terminal (S402). While the C-RNTI release timer operates, the BS maintains the connection with the S-gateway.

Before the C-RNTI release timer is expired (S403), when the connection request is received from the terminal, the BS configures the connection with the terminal by using the existing C-RNTI (S406). However, when the C-RNTI release timer of the terminal is expired, the BS releases the connection with the S-gateway (S404) and the terminal waits for a preamble for random access (S405).

When the connection with the terminal is configured by using the existing C-RNTI (S406), the BS allocates the uplink grant to the terminal (S407). Alternatively, when the terminal according to another exemplary embodiment of the present invention performs the contention based uplink transmission or the pre-scheduling, the BS may omit the uplink grant allocation. Thereafter, in the terminal, when the uplink data transmitted when the existing TA is valid is present, the BS may receive the uplink data from the terminal (S408).

As described above, according to the exemplary embodiment of the present invention, it is possible to simplify a connection procedure between a terminal and a base station and between the base station and a gateway and rapidly allocate an uplink resource to the terminal by reusing existing C-RNTI through a C-RNTI release timer and reusing the existing TA by determining the validity.

Figure 5:
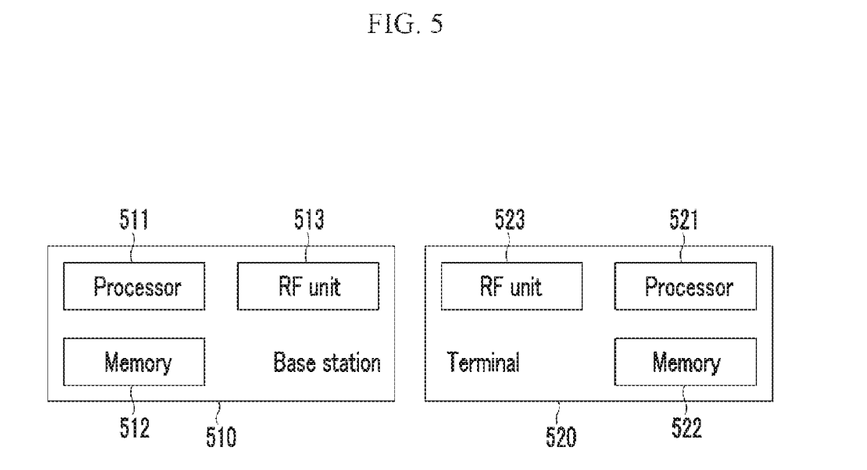
FIG. 5 is a block diagram illustrating a wireless communication system according to another exemplary embodiment of the present invention.

FIG. 5 is a block diagram illustrating a wireless communication system according to another exemplary embodiment of the present invention.

Referring to FIG. 5, a wireless communication system according to another exemplary embodiment of the present invention includes a base station 510 and a terminal 520.

The base station 510 includes a processor 511, a memory 512, and a radio frequency (RF) unit 513. The memory 512 may be connected with the processor 511 to store various information for driving the processor 511 or at least one program executed by the processor 511. The RF unit 513 is connected with the processor 511 to transmit and receive a radio signal. The processor 511 may implement functions, processes, or methods proposed in the exemplary embodiment of the present invention. In this case, in the wireless communication system according to the exemplary embodiment of the present invention, a wireless interface protocol layer may be implemented by the processor 511. The operation of the base station 510 according to the exemplary embodiment of the present invention may be implemented by the processor 511.

The terminal 520 includes a processor 521, a memory 522, and an RF unit 523. The memory 522 is connected with the processor 521 to store various information for driving the process 521. The RF unit 523 is connected with the processor 521 to transmit and receive a wireless signal. The processor 521 may implement functions, steps, or methods proposed in the exemplary embodiment of the present invention. In this case, in the wireless communication system according to the exemplary embodiment of the present invention, a wireless interface protocol layer may be implemented by the processor 521. The operation of the terminal 520 according to the exemplary embodiment of the present invention may be implemented by the processor 521.

In the exemplary embodiment of the present invention, the memory may be positioned inside or outside the processor, and may be connected with the processor through various means which are already known. The memory is various types of volatile or non-volatile storage media, and for example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for connection configuration of a terminal, comprising:
configuring a connection with a base station after being transited to an idle mode by using a cell-radio network temporary identifier (C-RNTI) which has been used in a connection mode before the idle mode, when a transmission request of uplink data occurs until a release time of the C-RNTI, wherein the release time of the C-RNTI is used to notify an end of a time of maintaining the C-RNTI in the base station;
verifying validity of an existing timing advance (TA) used in the connection mode before the idle mode; and
transmitting the uplink data based on the TA and an uplink grant received from the base station when the existing TA is valid.

2. The method for a connection configuration of claim 1, further comprising: configuring a connection with a network including the base station by using an existing non-access stratum (NAS) identifier (ID) when the transmission request of uplink data to the base station occurs after the release time elapses.

3. The method for a connection configuration of claim 2, wherein: the configuring of the connection by using the existing NAS ID includes broadcasting a preamble for random access to the base station.

4. The method for a connection configuration of claim 2, wherein: the NAS ID is a unique identifier between the terminal and a mobility management entity (MME), used in the connection mode before the idle mode.

5. The method for a connection configuration of claim 4, wherein: the NAS ID includes at least one of an international mobile equipment identity (IMEI), an international mobile subscriber identity (IMSI), and a globally unique temporary identifier (GUTI).

6. The method for connection configuration of claim 1, wherein: the verifying includes verifying validity of the TA based on a moving distance of the terminal calculated through mobility speed estimation (MSE) and a TA change distance for the TA.

7. A method for a connection configuration of a base station, comprising:
operating a C-RNTI release timer for release of a cell-radio network temporary identifier (C-RNTI) which has been used in a connection mode before an idle mode;
configuring connection with the terminal by using the C-RNTI when a connection request is received from the terminal before the C-RNTI release timer is expired; and
receiving the transmitted uplink data when an existing timing advance (TA) used in the connection mode before the idle mode is valid.

8. The method for a connection configuration of claim 7, further comprising: configuring the connection with the terminal by using an existing non-access stratum (NAS) identifier (ID) when a preamble for random access is received from the terminal after the C-RNTI release timer is expired.

9. The method for a connection configuration of claim 8, wherein: the NAS ID is a unique identifier between the terminal and a mobility management entity (MME), used in the connection mode before the idle mode.

10. The method for a connection configuration of claim 9, wherein: the NAS ID includes at least one of an international mobile equipment identity (IMEI), an international mobile subscriber identity (IMSI), and a globally unique temporary identifier (GUTI).

11. The method for a connection configuration of claim 7, further comprising: maintaining connection with a gateway configured in the connection mode before the idle mode while the C-RNTI release timer operates.

12. A terminal, comprising:
at least one processor;
a memory; and
an RF unit,
wherein at least one processor executes at least one program stored in the memory to perform;
receiving, by using the RF unit, information on a release time of a cell-radio network temporary identifier (C-RNTI) which is used in a connection mode before an idle mode from a base station after being transited to the idle mode; and
configuring a connection with the base station by using the C-RNTI when a transmission request of uplink data to the base station occurs for the release time,
configuring a connection with a network including the base station by using an existing non-access stratum (NAS) identifier (ID) when the transmission request of uplink data to the base station occurs after the release time elapses, wherein the NAS ID is a unique identifier between the terminal and a mobility management entity (MME), used in the connection mode before the idle mode, and includes at least one of an international mobile equipment identity (IMEI), an international mobile subscriber identity (IMSI), and a globally unique temporary identifier (GUTI).

13. The terminal of claim 12, wherein when performing the configuring of the connection by using the existing NAS ID, at least one processor performs broadcasting, by using the RF unit, a preamble for random access to the base station.

14. The terminal of claim 12, wherein: at least one processor executes at least one program to further perform verifying validity of an existing timing advance (TA) used in the connection mode before the idle mode, and transmitting the uplink data based on the uplink grant received from the TA and the base station when the existing TA is valid.

15. The terminal of claim 14, wherein: at least one processor executes the verifying to perform verifying validity of the TA based on a moving distance of the terminal calculated through mobility speed estimation (MSE) and a TA change distance for the TA.

* * * * *